: US008695903B2

(12) United States Patent
Gillis

(10) Patent No.: US 8,695,903 B2
(45) Date of Patent: *Apr. 15, 2014

(54) PROCESSING OF STEEL MAKING SLAG

(75) Inventor: James M. Gillis, Chassell, MI (US)

(73) Assignee: Westwood Lands, Inc., Negaunee, MI (US)

( * ) Notice: Subject to any disclaimer, the term of this patent is extended or adjusted under 35 U.S.C. 154(b) by 499 days.

This patent is subject to a terminal disclaimer.

(21) Appl. No.: 12/898,276

(22) Filed: Oct. 5, 2010

(65) Prior Publication Data

US 2011/0072935 A1 Mar. 31, 2011

Related U.S. Application Data

(63) Continuation-in-part of application No. 11/614,654, filed on Dec. 21, 2006, now Pat. No. 7,810,746.

(51) Int. Cl.
*B02C 21/00* (2006.01)
*B02C 17/02* (2006.01)

(52) U.S. Cl.
USPC ....................................... 241/24.14; 241/79.1

(58) Field of Classification Search
USPC ......... 241/5, 18, 24.1, 24.14, 26–27, 275, 20, 241/79.1
See application file for complete search history.

(56) References Cited

U.S. PATENT DOCUMENTS

| | | | |
|---|---|---|---|
| 2,264,204 A | 11/1941 | Heckett | |
| 2,352,712 A | 7/1944 | Heckett | |
| 2,971,703 A | 2/1961 | Rath | |
| 3,049,305 A | 8/1962 | Rath | |
| 3,081,954 A * | 3/1963 | Heckett | 241/14 |
| 3,086,718 A | 4/1963 | Lukas, Jr. | |
| 3,165,268 A | 1/1965 | Haussig | |
| 3,330,644 A | 7/1967 | Haussig | |
| 4,502,179 A | 3/1985 | Coughlin et al. | |
| 4,666,591 A | 5/1987 | Imai et al. | |
| 4,747,547 A | 5/1988 | Harada | |
| 5,961,055 A * | 10/1999 | Lehtinen | 241/24.14 |
| 6,258,150 B1 | 7/2001 | MacKellar | |
| 6,783,088 B1 | 8/2004 | Gillis et al. | |
| 2005/0001082 A1* | 1/2005 | Strauss et al. | 241/275 |
| 2006/0138265 A1* | 6/2006 | Strauss et al. | 241/275 |

OTHER PUBLICATIONS

International Search Report for PCT/US07/84125, Mar. 31, 2008, 2 pages.

* cited by examiner

*Primary Examiner* — Faye Francis
(74) *Attorney, Agent, or Firm* — Reising Ethington P.C.

(57) ABSTRACT

A system for processing slag material from a steelmaking process includes reducing the average particle size of slag from a steelmaking process into finer particle size material by directing the slag against a surface at a velocity sufficient to cause the slag to break into smaller pieces, and separating the finer particle size material into at least an iron rich product and a silicate rich product based on the differences between these products in at least one or more properties including magnetic susceptibility, particle size, weight or specific gravity. Directing the slag against a surface to reduce the average slag particle size can better separate the dissimilar materials in the slag from each other, and result in less dust generation and less energy consumption compared to grinding the slag material.

8 Claims, 6 Drawing Sheets

| Table 1. Particle Size Distribution and Iron Contents ||||
|---|---|---|---|
| Screen Size | Weight % | Metallic Iron % | Total Iron % |
| +1/2" | 0.00 | 0.00 | 0.00 |
| +3 Mesh | 1.72 | 43.47 | 52.27 |
| +8 Mesh | 39.06 | 39.20 | 48.86 |
| +14 Mesh | 18.33 | 33.96 | 37.01 |
| +28 Mesh | 14.65 | 37.93 | 44.04 |
| +65 Mesh | 14.52 | 23.74 | 34.34 |
| +100 Mesh | 4.15 | 15.25 | 19.57 |
| +150 Mesh | 2.58 | 11.65 | 20.69 |
| +200 Mesh | 2.41 | 12.70 | 17.66 |
| -200 Mesh | 2.58 | 7.73 | 16.28 |
| Total | 100.00 | 32.73 | 40.40 |

PROCESSING OF STEEL MAKING SLAG

REFERENCE TO CO-PENDING APPLICATION

This is a Continuation-in-Part of U.S. patent application Ser. No. 11/614,654 filed Dec. 21, 2006 now U.S. Pat. No. 7,810,746 granted Oct. 12, 2010, which is incorporated herein, by reference, in its entirety.

TECHNICAL FIELD

The present disclosure relates generally to byproducts of the steel making process and more particularly to methods for processing steel making slags.

BACKGROUND

Steel making slags are the byproducts of the steel making processes. Typically, steel making slags are produced from the basic oxygen furnace of the steel mills, and there are several kinds of slags produced from iron and steel making facilities. Blast furnaces are generally utilized to reduce iron oxide to iron. The slag generated from blast furnaces is referred to as BF slag. Next, the iron may go through a desulfurization step to remove sulfur from the iron. The slag generated here may be called desulfurization slag, and it may be rich in sulfur. Lastly, the desulfurized iron is placed in a basic oxygen furnace (BOF) to convert iron to steel by removing carbon and other impurities. Slags may also be produced from electric arc furnaces (EAF).

It currently is believed that the steel industry in the United States generates about 30 million tons of byproducts each year. The majority of these byproducts are present in various forms of slags, sludges and dusts. There may be about 12.5 million tons of BF slag, 6 million tons of BOF type slag, 4.5 million tons of EAF slag, 1.5 million tons of desulfurization slag, 2 million tons of BF and BOF sludges and 1 million tons of dust. Previous efforts of processing such byproducts have achieved only limited success. As a result, large amounts of byproducts of various types and qualities have been stockpiled at steel mills where available space is diminishing. Additionally, valuable minerals and materials lie within the slag, going unused and essentially wasted.

SUMMARY

A process for separating different products from steelmaking slag includes reducing the average particle size of slag from a steelmaking process into fine particle size material, and separating the fine particle size material into at least an iron rich product and a silicate rich product based on the differences between these products in at least one or more properties including magnetic susceptibility, particle size or specific gravity.

In one implementation, the slag material is reduced in size until it has an average particle size of about 25 to 400 mesh. Moisture removal may be employed prior to or while the particle size is being reduced, such as by crushing or grinding. Thereafter, a gravitational separation may be utilized, and that separation may be assisted by an airflow that lifts lighter materials and permits heavier materials to sink or not be lifted. In general, the heavier materials have a higher iron content and may be placed into a group separate from the lighter materials. A magnetic separation may also be utilized and that process may also be assisted by an airflow, if desired. Lower magnetic field strengths may be used to attract more highly magnetic particles that have higher total iron content. Varying magnetic field strengths may be used to separate the material into varying groups of differing iron content. And particle size separation can be employed, such as be screening the material. In general, the larger particles in dry and crushed or ground slag material is higher in iron content. This provides the basis for one or more separation steps based on particle size. Of course, all of the methods may be utilized in one process to provide a number of different products or groups of materials usually including at least one of each of a metallic iron rich product, an iron oxide product and a silicate rich product.

In another implementation, a system for processing slag material from a steelmaking process includes reducing the average particle size of slag from a steelmaking process into finer particle size material by directing the slag against a surface at a velocity sufficient to cause the slag to break into smaller pieces, and separating the finer particle size material into at least an iron rich product and a silicate rich product based on the differences between these products in at least one or more properties including magnetic susceptibility, particle size, weight or specific gravity. Directing the slag against a surface to reduce the average slag particle size can better separate the dissimilar materials in the slag from each other, and result in less dust generation and less energy consumption compared to grinding the slag material.

A system for processing steelmaking slag may also include reducing the average particle size of slag from a steelmaking process into finer particle size material, separating the finer particle size material into at least two different product groups based on the differences between the materials in the product groups in at least one or more properties including magnetic susceptibility, particle size or specific gravity, and moving at least a portion of the finer particle size material in enclosed tubes among a plurality of workstations wherein it is separated into different product groups.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
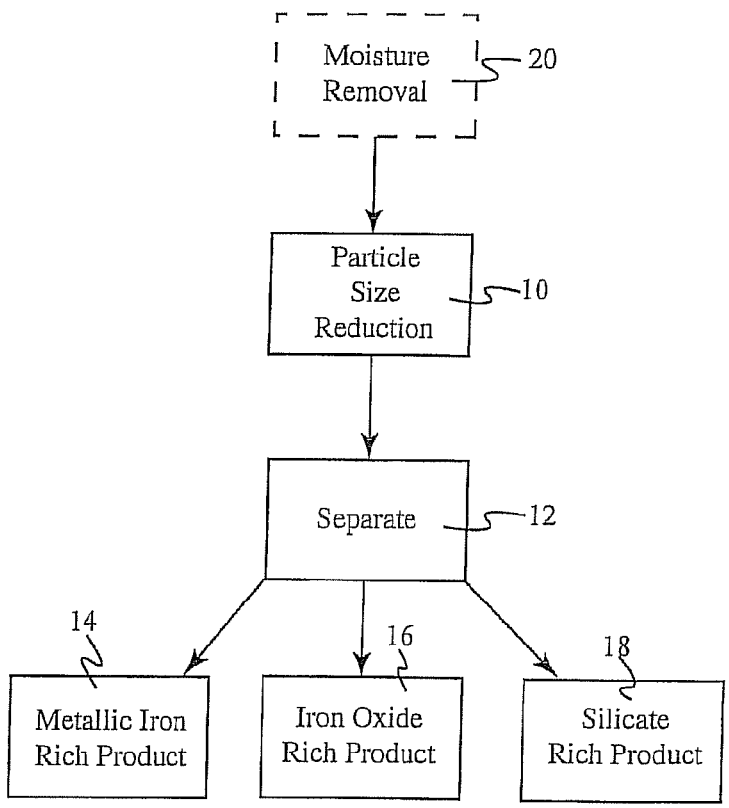
FIG. 1 is a diagram illustrating a general method of processing steelmaking slag into various products or product groups.

Referring in more detail to the drawings, FIG. 1 illustrates a general process flow for one implementation of a method for processing steel making byproducts or slag. In general terms, the slag is ground or otherwise reduced in size at 10 to liberate the mineral and metal components in the slag and reduce the material to particles of relatively fine or small size. The fine particle size material is then separated at 12 based on differences between the magnetic susceptibility, particle size, and/or specific gravity or specific density of the components of the material. In one implementation of the process, the material is separated into at least one iron rich product and at least one silicate rich product. In one further form, the material is separated into at least one metallic iron rich product 14, at least one iron oxide rich product 16, and at least one silicate rich product 18.

In one implementation one or more separation techniques are employed to separate the slag material into a metallic iron rich product, an iron oxide rich product and a silicate rich product. In one such implementation, the metallic iron rich product includes more than 70% total iron content, the iron oxide rich product generally includes about 30-70% total iron content, and the silicate rich product includes less that 30% total iron content. In general, the higher the total iron content in the metallic iron and iron oxide rich products, the better or more desirable the products are in the market. A portion of the total iron content in the iron-oxide rich product may be contributed by metallic iron and/or iron in silicate or other minerals. The silicate rich product may have an average particle size smaller than 65 mesh. In general, the smaller the particle size the higher the reactivity of the product will be. Of course, the process can produce more than one of each of the above-named products. For example, more than one type, grade or class of metallic iron rich product may be generated, and the same holds true for both the iron oxide rich product and the silicate rich product. The different types of products may include varying degrees of iron content or other property or characteristic as desired.

While fresh steel making slags are dry, stored steel making slags may include moisture that can affect the separation of the various products from the materials. Accordingly, as shown in FIG. 1, a moisture removal step 20 may be performed prior to or at the time of grinding or otherwise reducing the size of the slag particles. Accordingly, a drying or moisture removing device can be installed prior to a crusher or grinding mill. Moisture removal can also be assisted or accomplished by draining, filtering or centrifuging, and may include a forced air flow or thermal drying process. A forced air flow can also be provided inside the grinding mill or crusher. Generally, significant heat is generated by friction as the metallic rich slag material is ground or crushed and so this process may have inherent drying capacity to remove a significant amount of moisture. However, if additional heat is desired, the air can be preheated before it is drawn into or forced through the mill or other size reduction device(s) or process(es).

In addition to potential moisture removal steps or procedures, additional treatment of the slag may be required prior to fine grinding or crushing of the slags. For example, this may be done to avoid materials too coarse from getting into the grinding mills or crushers. This can be done by screening and/or precrushing and at this phase, tramp materials can be removed. Crushing may be carried out with crushers of various type including, for example, pressure type and impact type crushers. Pressure type crusher may include, for example, jaw, cone, gyratory and roll crushers. Impact type crushers may include, for example, hammer mill and vertical and horizontal impact crushers.

To crush the slag, it can be fed into a crusher or a series of crushers for staged crushing. For example, a jaw crusher and a roll crusher can be combined for a two-stage crushing operation. In such an example, the jaw crusher may be utilized to reduce the slag material to about −½ inch particle size, which generally indicates that the particles will pass through a screen or other device having an average opening size of about ½ inch. Material of the noted particle size may then be fed into a roll crusher to further crush the material so it passes through a screen having an opening size on average of 4 mesh, 10 mesh, or any other size desired for a given application.

The screened, crushed or appropriate slag material may be further reduced in size by finely grinding it to liberate the mineral and metal components in the slag. The particle size for liberation of the mineral and the metal components depends at least in part on the operating condition of the steel mills and the type of slag being processed. In one example, the majority of the components can be liberated when the average particle size is in the range of 28-400 mesh. Representative grinding mills may include rod mills, ball mills, autogenous mills, conical mills, vertical roller mills, roller presses, jet mills and others. Like crushing, grinding can be achieved with a single mill or with a series of mills for stage grinding. And different types of grinding mills and devices can be employed in a staged grinding process.

The relatively dry and fine particle size material is then processed to separate it into various products or product groups. Generally, separation of the various mineral and metal components from the fine particle sized material is undertaken, in one implementation of the invention, by way of one or more of gravitational, and/or magnetic and/or particle size separation methods. The gravitational separation method may be achieved based on the differences in the specific gravities of metallic iron, iron oxide and silicates which have specific gravities of about 7.8, 5.2 and 3.0 g/cm$^3$, respectively. The magnetic separation methods may be employed based on the different magnetic susceptibilities of metallic iron, iron oxide and silicates, which are about 1, 0.1 and 10$^{-6}$, respectively, in CGSM. The particle size separation may be achieved based on the tendencies for the different products to form different particle sizes during the crushing and/or grinding processes. In general, metallic iron is more malleable and during grinding tends to flatten out forming a larger particle size than the silicate particles. Silicates are more fragile than metallic iron and tend to form finer particles after grinding. Therefore, on average, the smaller particle fraction of the ground slag material tends to include a higher concentration of silicates than the larger particle size fraction of the ground slag material. Accordingly, the differences between the physical characteristics and properties of the end products provide a basis for the different methods of separation into one or more desired end products.

Figure 2:
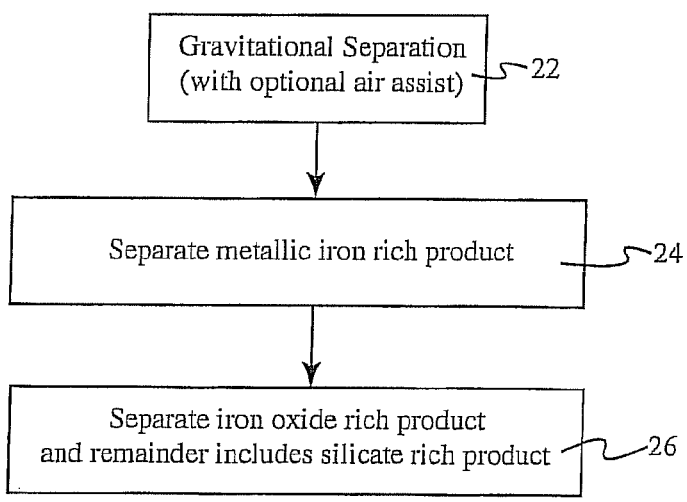
FIG. 2 is a diagram illustrating one method of processing slag using gravitational separation.

Gravitational separation 22 of the materials, as generally set forth in FIG. 2, can be carried out with devices such as an air aspirator, air table, air jig or cyclone. For example, one aspirator utilizes an upward air flow within a column to separate the materials. Heavier material sinks while lighter material is lifted, and by adjusting the air velocity, materials with different specific gravities can be separated in this manner. Baffles may be disposed in the column to assist in the separation. The air tables, air jigs and cyclones basically use the same air velocity principle to achieve separation.

Separation of the slag material into the various products can be conducted by setting the air velocity at a higher value to separate at 24 the heaviest product, which is the metallic iron rich product, in a sink or a lower collection area. Material not collected in the sink may include both iron oxide rich product and silicate rich product, and depending on the air velocity used in the separation, a certain amount of metallic iron rich product as well. Material not collected in the sink of the apparatus may be further separated at 26 at a lower air velocity. At a lower air velocity, heavier iron oxide rich product will be collected in a sink or lower collection area and a lighter silicate rich product may be collected in a lift or upper collection area. In at least some implementations, the air velocity may be between 0.001 m/sec to 15,000 m/sec, preferably between 0.1 m/sec to 2,000 m/sec and more preferably between 1 m/sec to 100 m/sec.

Of course, additional phases of gravitation separation may be employed. For example, the metallic iron rich product collected in the sink in the first phase of the gravitational separation may be processed again to divide or separate it into two end products having different iron content. The material may be subjected to a higher air velocity such that heavier products, generally higher in iron content, will be collected in the sink and less heavy materials, which may have a lower iron content, may be collected in the lift. The materials collected in the lift may be an iron oxide rich product, or a metallic iron rich product having a lower iron content than the materials collected in the sink. Using this process logic, phased gravitational separations with successive changes in the air velocities can generate a series of products that may have differing iron content.

Figure 3:
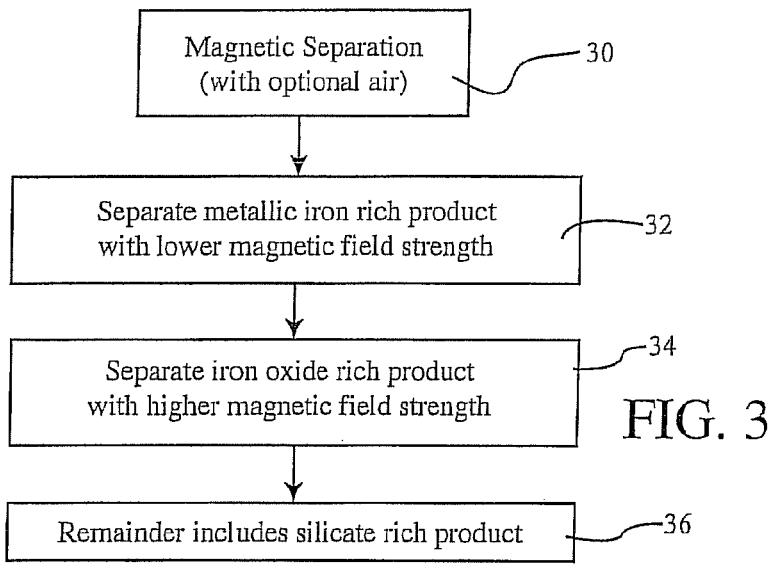
FIG. 3 is a diagram illustrating one method of processing slag using magnetic separation.

As generally shown in FIG. 3, the slag material may also be separated by use of a magnetic field at 30. For example, at 32 a lower magnetic field strength will attract the more highly magnetically susceptible metallic iron rich product from the slag material while failing to attract the remaining material. A second, higher magnetic field strength may be applied at 34 to the remaining material to separate out the iron oxide rich product which is more magnetically susceptible than the silicate rich product. The magnetic field strength can be adjusted by selecting the appropriate permanent magnet or by the use of an electromagnet. By way of example, the magnetic field strength can be in the range of 50 gauss to 20 Kilogauss. In one implementation it desirably was between 100 gauss and 10 Kilogauss, and was preferably between 500 gauss and 5 Kilogauss.

Further, in one presently preferred implementation, an air flow may be provided with the magnetic separation to lift or counteract the magnetic force and permit improved control over the separation process. Of course, the velocity of the air may be changed and with the adjustment of the air and magnetic forces, various products ranging from high iron content to low iron content can be generated. Air velocity can be controlled in different ways. One way is to carry all of the slag material in the air and cause it to pass through a magnetic separator. The higher the air velocity, the less a given particle tends to be influenced by the magnetic separator. Separation of metallic iron can, therefore, be accomplished by using lower magnetic field strength and/or higher air velocity. Iron oxide particles can be separated at higher magnetic field strength and/or lower air velocity. Finally, silicate particles have the lowest magnetic susceptibility and may therefore be rejected from the magnetic separator at appropriate magnetic field strengths and/or air velocities, as shown at 36 in FIG. 3.

Another way to control air velocity and magnetic separation is to blow or suck the slag material on a conveyor or moving bed disposed adjacent to or passing near a magnet. In the area of the magnet, magnetic force will attract or hold particles of a sufficient magnetic susceptibility and particles of less magnetic susceptibility or non-magnetic particles will be blown or sucked away by the air. The speed of the moving conveyor or bed can also be a factor that may be adjusted to assist in the separation. Higher speeds can reduce the magnetic attraction and help the rejection of less magnetic particles. Lower speed helps retain the magnetic particles. In at least some implementations, the conveyer speed may be in the range of 0.1 m/min to 100 m/min, preferably between 0.5 m/min to 30 m/min and more preferably between 1 m/min and 20 m/min.

Figures 4, 6:
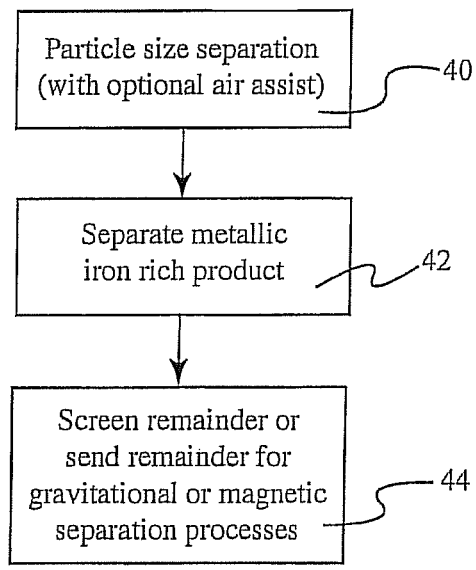
FIG. 4 is a diagram illustrating one method of processing slag using particle size separation.
FIG. 6 is a chart showing iron content of various sized particles of a supply of "c-scrap" slag material.

Separation based at least in part on particle size can also be performed, generally as shown in FIG. 4 at 40. Screening can facilitate the separation of various products in at least two ways. First, by initially screening the slag material into various size fractions or portions, the gravitational and/or magnetic separations can be undertaken for a less diverse size range of particles of material and can therefore be accomplished more efficiently. Another way the screening or size separation can help the separation of various particles is by separating out metallic iron product directly. In general, metallic iron is more malleable than the silicate product and is not easily broken during grinding. Accordingly, at least some of the metallic iron particles can be courser or larger than the rest of the particles after the crushing and/or grinding. This portion of the metallic iron can be screened out directly at 42 to be a portion of or a separate metallic iron rich product. The screening can be carried out with horizontal, inclined, vibrating and ultrasonic screen devices, for example. As shown at 44, the remainder of the material can be further screened to, for example separate out an iron-oxide rich product, or it may be processed by a different separation technique.

The particle size to screen out metallic iron in one implementation can range from 14 to 200 mesh, depending on the extent of grinding and/or crushing of the initial or input slag material. For a wide range of slags, a 35 or 65 mesh screening is generally appropriate to yield a metallic iron product having a desirably high iron content. The larger material particles separated out by screening can be further processed, such as by grinding or crushing and further separation including gravitational or magnetic separation or particle size screening, to provide products of varying iron content. Due to the abrasive nature of slag particles, it may be desirable, at least in some applications, to utilize the particle size separation as a secondary separation process to limit the amount of material that passes through a given screen. Of course, despite this consideration, particle size separation can be employed as the primary separation method as desired.

Figure 5:
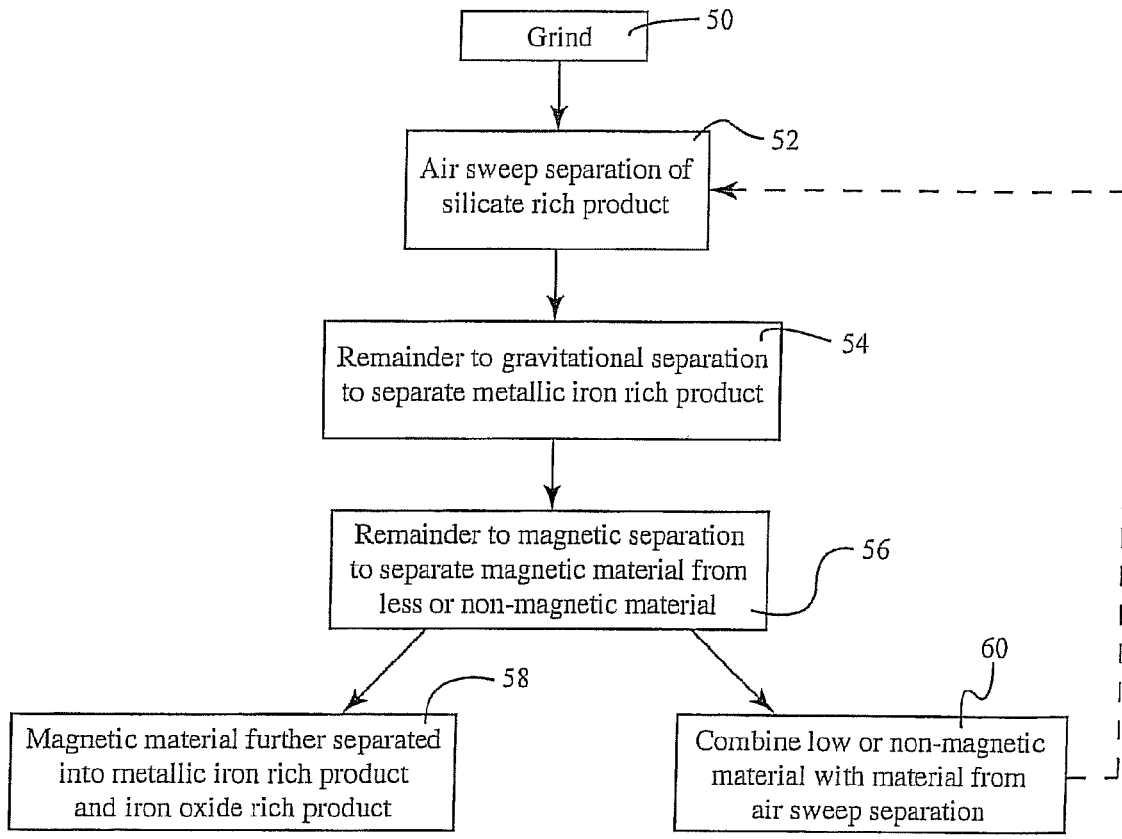
FIG. 5 is a diagram showing one implementation of a method of processing slag using a combination of separation techniques.

The various separation processes and techniques described herein are not mutually exclusive. Each of the techniques and processes may be combined with other techniques and processes for separating the slag material into various products. For example, as shown in FIG. 5, while the slag material is being ground at 50, an air flow can be provided to remove the lightest materials at 52, including silicate rich product. Thereafter, the heavier remaining portions of the ground material can be subjected to a gravitational separation at 54 providing, for example, a metallic iron rich product in the sink and, the remainder, which may include an iron oxide rich product, in the lift. The remainder can be subjected to a magnetic separation process at 56 to yield a first more highly magnetic product and a second, less magnetic product. Each of these products may be further processed by any of the processing techniques to provide still further product groups or fractions having varying iron content. By way of example, the more magnetic material may be subjected to further magnetic separation at 58 to provide a metallic iron rich product and an iron oxide rich product. One or more of the products from the various processes can be combined together, such as shown at 60, usually by combination of relatively similar iron content products from one or more groups.

In this manner, one or more metallic iron rich products may be separated from the slag along with one or more iron oxide rich products and one or more silicate rich products. Each of these products may have varying uses in different industries or applications and may have its own commercial value. In addition, the extent to which metallic iron is separated from the silicate rich product, for example, may be depend on the particular industry or application to which the end products will be used. For example, there are applications for the silicate rich product wherein metallic iron can be detrimental, or undesired. For example, the cement industry can use the silicate rich product as a raw material for clinker manufacturing if the metallic iron is sufficiently removed. Accordingly, to provide a silicate rich product for such an application, the silicate rich product may be subjected to several phases of separation to ensure sufficient metallic iron removal.

In another example, the slag material may be ground and then magnetically separated to yield a metallic iron rich product separated from the remainder of the slag material. The remainder of the slag material can be magnetically separated further at a higher magnetic force to separate from the remaining material a product that is less magnetically susceptible than the first metallic iron rich product previously separated. This second, less magnetic product may be an iron oxide rich product. The remaining material may be a silicate rich product. Each of the products separated from the initial slag material can be further processed to again provide groups or fractions of products of varying iron content. For example, the iron oxide rich product can be further separated into two groups each of which may fall within the "iron oxide rich product" category but have varying total iron content.

In a first exemplary experimentation, a sample of "c-scrap" slag was analyzed to determine the iron content based on particle size. The results of that analysis are contained in the chart of FIG. 6 which demonstrates that the larger particles generally contain a higher total iron content than the smaller particles. C-scrap material generally comprises –⅜ inch magnetic material that is a portion of the BOF slag. The –⅜ inch designation means that the material passed through a screen or other separator having an average opening size of ⅜ inch.

This c-scrap slag material was then crushed to pass through a 10 mesh screen and fed into a rod mill. After 30 minutes of grinding, the material had a reduced average particle size and the material was gravitationally separated with an air aspirator. By adjusting the air velocity, three products were obtained. A metallic iron rich product was produced in the sink fraction with an air velocity at 70 ft/sec. An iron oxide rich product was lifted with an air velocity at 70 ft/sec but sank at an air velocity of 47 ft/sec. The silicate rich product was generated by collecting the lifted material at 47 ft/sec air velocity. The total iron content of the metallic iron rich product was 92.88%, the iron oxide rich product had an iron content of 68.72%, and the silicate rich product had an iron content of 24.24%. The silicate rich product was separated based on particle size and the percent by weight for each size group is reported in the table below.

| Size (Mesh) | Size (Microns) | Wt. % | Cumulative Wt. % |
|---|---|---|---|
| +35 mesh | 420 | 3.11 | 3.11 |
| +48 mesh | 297 | 1.70 | 4.81 |
| +65 mesh | 210 | 27.97 | 32.78 |
| +100 mesh | 149 | 18.64 | 51.42 |
| +150 mesh | 105 | 10.45 | 61.87 |
| +200 mesh | 74 | 11.86 | 73.73 |
| +270 mesh | 53 | 5.08 | 78.81 |
| −270 mesh | 44 | 21.19 | 100.00 |

The iron oxide rich product, which contained 68.72% iron was further magnetically separated in an air swept magnetic separator. The two products obtained from the separation included a metallic iron rich product having 78.79% iron and a iron oxide rich product having 62.02% iron.

The silicate rich product, which contained 24.24% iron, was also further separated with an air swept magnetic separator. The two products obtained from that separation included an iron oxide rich product having 61.27% iron and a silicate rich product having 18.73% iron. Finally, the metallic iron rich product generated from the further possessing of the original iron oxide rich product and which contained 78.79% iron as noted above, was screened at 65 mesh. The product that did not pass through the screen and hence, was coarser than 65 mesh, contained 87.22% iron which is a metallic iron rich product with higher iron content than the total product group prior to the screening operation. The portion of the metallic iron rich product which passed through the 65 mesh screen had an iron content of 72.42%. In the current market, the higher iron content product can sell for a higher price, thus justifying the further separation of the original metallic iron rich product.

Figure 7:
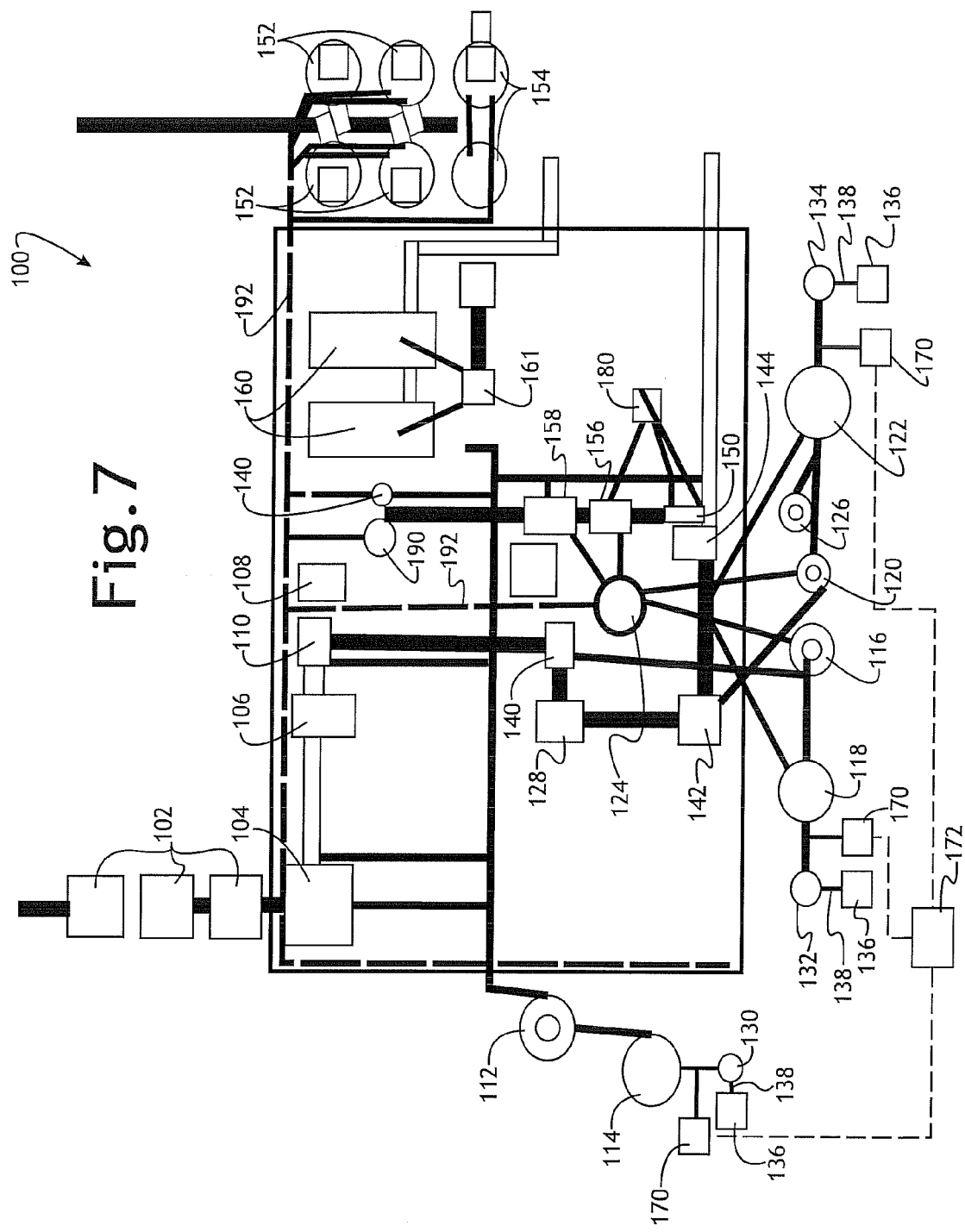
FIG. 7 is a schematic diagram of an exemplary facility layout for an alternate slag processing system.
Figure 8A:
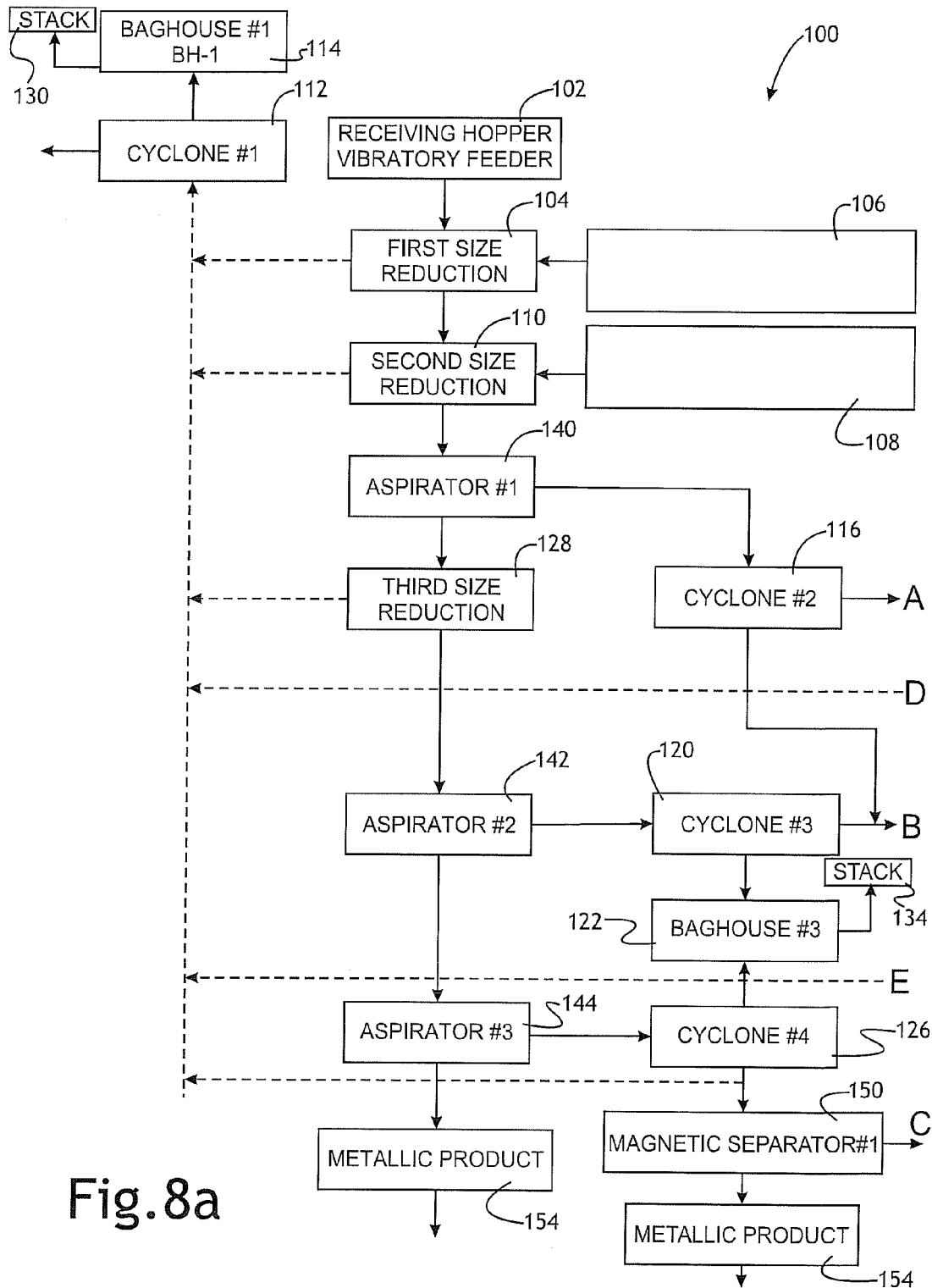
FIGS. 8a and 8b are a flow chart of one exemplary slag processing system.
Figure 8B:
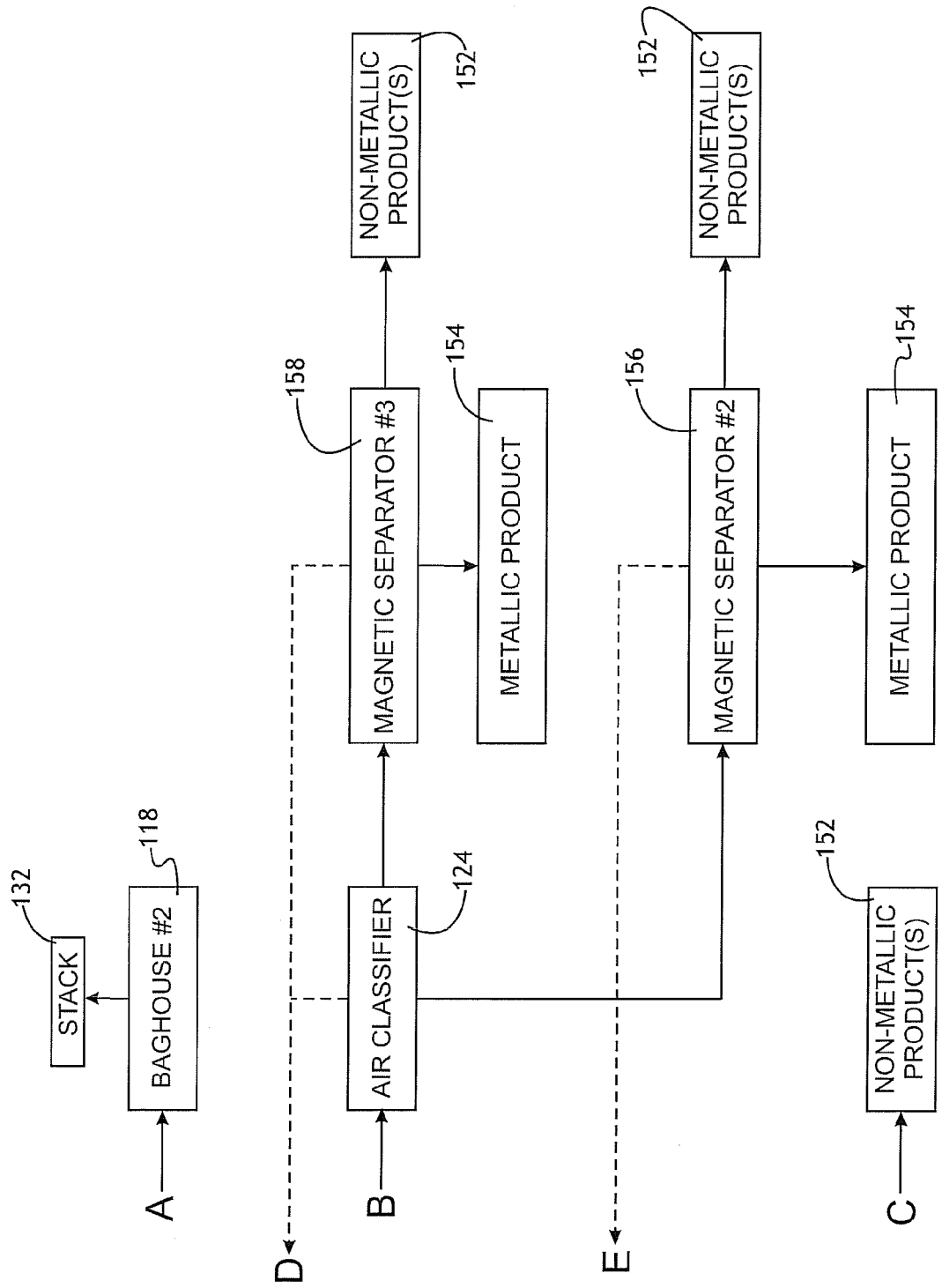

In another implementation, as shown in FIGS. 7 and 8, the slag may be processed and divided into at least two product groups including a course metallic fraction and a fine metallic fraction. The process to produce these product groups may include several stages, with an exemplary process including—size reduction, classification, and magnetic separation. A number of ancillary operations may also be implemented during or in addition to one or more of the stages, for example, to reduce emissions or airborne materials or contaminants. A general overview of one presently preferred process 100 will first be provided and will be followed by more detailed discussion of the various stages and workstations that may be used in the process.

With at least some grades, sizes or other types of slag used as the input feed to the system or process 100, a considerable amount of size reduction may be required if the metallic particles contained in the slag are of relatively small size. As a result the process may incorporate more than one stage of size reduction Each stage of size reduction may be linked to a dust collection system and at least some of the size reduction stages may be linked to an aspirator to assist in the collection of the smallest size material (e.g. dust and very fine material) generated as a result of the size reduction process. The removal of the smallest size material from the resulting product streams may be accomplished by way of one or more cyclones and filters (such as in a baghouse) following a first stage of size reduction, while the smallest size material removed from the streams following subsequent stages of size reduction may each pass through an air assisted separator with the smallest material from the air assisted separator being routed to one or more cyclones, and the smallest material from the cyclone(s) being routed to one or more filters. The underflow or larger size material from the each of the cyclones may be combined and passed through an air classifier to produce a fine and very fine fraction. A coarse or larger size material fraction passing through a second aspirator may be directed to a third aspirator offering additional material separation, while also serving to remove dust from that material. The liftings or smallest and lightest materials from the third aspirator may be directed to a cyclone and on to one or more filters.

Following the removal of the larger sized material from the first size reduction workstation, the remaining material streams (which in one implementation may be divided into and include medium, fine, and very fine fractions) may be conveyed to magnetic separators which serve to separate the predominantly ferrous from the non-ferrous particles. When it is deemed necessary the medium fraction may be further reduced in size to further facilitate the liberation of the ferrous materials from that material. The resulting product may then be directed to a magnetic separator, such as the magnetic separator used in the processing of the fine fraction. The non-ferrous fraction from each of the magnetic separators may then be routed to a low-grade iron receiving hopper and/or silo. The material in the silo may be fed to a paddle mixer and blended with water to prevent the generation of dust and produce a moist cake that may be disposed of, or used in the production of other products. The magnetic fractions are in turn routed to one or more high grade iron silos.

The resulting product contained in the high grade iron silos may be routed to one or more briquetting stations where it may be combined with a binder (such as hydrated lime and molasses) to consolidate the finer iron rich particles. The resulting briquettes make it easier to handle the product and allow use of the particles in a wider spectrum of furnace designs including BOF's that otherwise would be unable to accept the finer fractions.

Incoming Materials

As shown in FIGS. 7 and 8, the feedstock may be received into one or more receiving hoppers 102. In one implementation, two receiving hoppers which may be located within the enclosure in which the incoming material is stored, may also receive material directly from a truck or from a front end loader used to transport slag from the initial internal storage area to the hopper. The material in either receiving hopper may be routed to the processing facility, and as a result provide the feed stream for the initial or first size reduction workstation 104. The use of two hoppers allows for the blending of various feed streams which can be used to assist in the minimization of the moisture content in the slag received and will in turn reduce the required drying time (if any is needed) while also serving to minimize the energy requirements for drying the feed stream. Vibratory feeders may be used to assist in the delivery of the slag as it passes from each receiving hopper onto the associated conveyor belt that will deliver the slag to either the contained stock piles or the first size reduction workstation 104.

Material Drying

The feedstock slag material may dry on its own during the time it is stored, or piles of material can be formed to expose more of the material to ambient and allow water to evaporate or flow out under gravity. If desired, in addition to or instead of this passive drying, active drying stations or devices can be used. In one exemplary system, a direct fired process air heater 106 with the capacity to deliver up to 10 MMBtu's while providing an airflow of 10,000 cfm is used to assist in the drying of the as received feedstock that will be conveyed from the receiving hopper to the first size reduction workstation 104. The output from the heater 106 may be routed, such as through a series of insulated ducts, to the first size reduction workstation 104 (or other suitable location or workstation in the system). In one implementation, the output of the heater 106 is routed into the output of the first size reduction workstation 104, preferably countercurrent to the flow of the solids passing through the workstation. An exemplary heater that may be used is a Series D process heater manufactured by Dayco Industrial Heating and Processing Equipment of Pottstown, Pa. The resulting hot air stream evaporates a substantial percentage of the moisture carried on the surface of the slag, and can also serve as the medium in the classification and transportation away from the workstation of the fine, low density, particles generated as a result of the initial size reduction of the slag.

Another drying unit, such as an air heater 108, may also be used to assist in the drying of the material discharged from the secondary size reduction workstation 110, if desired. In one system, the output from the drying unit 108 may be routed into the intake of the secondary size reduction unit 110, that is, concurrent with the flow of the solids passing through that workstation. The heated air flow will evaporate residual moisture carried on the surface of the slag, while also providing air flow for the classification and transportation of the fine, low density, particles generated as a result of the reduction of the slag that has taken place in the secondary crusher. An exemplary drying unit is a direct fired heater manufactured by Dayco Industrial Heating and Processing Equipment of Pottstown, Pa., and may have the capacity to deliver up to 20 MMBtu's while providing an airflow of 20,000 cfm.

Dust Collection and Material Classification

Cyclones

A first cyclone 112 associated with the primary dust collection system may provide a high speed rotating air-flow within a cylindrically shaped unit. The larger/denser particles in the air stream that have too much inertia to follow the tight curve of the air stream strike the outside wall of the unit and make their way to the bottom of the cyclone 112 where they are collected or discharged. As a result, in this application, the majority of the solids will be separated from the air stream and pass through a coarse discharge of the cyclone 112. The material that exits the cyclone 112 through the coarse discharge may be further processed, if desired, or it may be conveyed to product storage areas such as silos 152 for non-metallic product storage. The geometry of the first cyclone 112, together with air flow rate, will serve to define the threshold of the material that is separated out in the cyclone. The small percentage of fine material carried out with the air stream from the cyclone 112 is routed to a filter, such as may be contained within a first baghouse 114, and as a result be contained by the filter media in the first baghouse. The first cyclone 112, in one implementation, is a model CK-138, manufactured by Kice. Of course, other devices may be used, as desired for a particular application.

Like the first cyclone 112 one or more additional cyclones may be used in different portions of the slag processing system, as desired. In one implementation, four cyclones are used. A second cyclone 116 may be a model CK-108, manufactured by Kice, and its geometry, together with air flow rate, will serve to determine what materials are routed to a filter (e.g. a baghouse) or are routed through the coarse discharge of the cyclone. In the system shown, the finer materials that are carried out with the air stream at the top of the cyclone are routed to a second baghouse 118 and as a result are contained by the filter media in the second baghouse. The third cyclone 120, in one implementation, may be a model CK-90, manufactured by Kice. The third cyclone may be connected to or otherwise communicated with a third baghouse 122, and an air classifier 124, as will be discussed in more detail herein. The fourth cyclone 126 may be a model CK-78 manufactured by Kice and may be connected to or communicated with the third baghouse 122 and a magnetic separator.

Baghouses

The primary dust collection system may include one or more filters or groups of filters, as previously noted. In one implementation, a plurality of filters are carried within a common housing, and may collectively be referred to as a "baghouse". The first baghouse 114 may be manufactured by Donaldson Torit and have 7,555 square feet of filter media and provide 40,000 cfm of moist, dust-laden air based on an air to cloth ratio of 5.29:1. This filter unit has a housing velocity of about 1,839 ft/min. The industrial fan associated with this system uses a 200 hp motor to drive a fan offering 40,000 cfm @ 18 inches wc using 146 bhp, based on standard temperature and pressure. The unit may also include a reverse air bag cleaning fan that provides air flow in an opposite direction to the filter flow so to facilitate removing particulate from the filters.

Of course, any number of baghouses or filters may be used in a particular application. In the implementation shown in FIGS. 7 and 8, three baghouses 114, 118, 122 may be used. The second baghouse 118 may include a model CR236-12 Top-Bag Removable Filter manufactured by Kice with about 3,300 square feet of filter media and capable of providing 19,200 scfm of dry, ambient, dust-laden air based on an air to cloth ratio of 5.81. This filter may have a housing velocity of 180 ft/min and the fan associated with this system may use a 100 hp motor to drive a fan offering 19,200 cfm @ 18 inches wc using 83.3 bhp, based on standard temperature and pressure. The unit may also include a 20 hp reverse flow air bag cleaning fan. The third baghouse 122 may include a model CR344-12 Top-Bag Removable Filter manufactured by Kice with about 4,800 square feet of filter media, a flow rate of 24,000 scfm of dry, ambient, dust-laden air based on an air to cloth ratio of 4.98. This filter may have a housing velocity of 159 ft/min. The fan associated with this system may use a 125 hp motor to drive a fan offering 24,000 cfm @ 18 inches we using 104 bhp, based on standard temperature and pressure. The unit also may include a 25 hp reverse air bag cleaning fan.

The primary dust collection system may be used in the collection of fine particulate from multiple points in a slag processing facility, or from multiple workstations used in processing slag. The system may be used in the filtering of air and particulate streams relating to the size reduction workstation(s), the air classifier(s), as well as the magnetic separation units. In one presently contemplated implementation, it has been estimated that approximately 10,000 cfm will be required in the collection of dust from the first size reduction station 104, the secondary size reduction station 110 will require approximately 20,000 cfm, while a tertiary size reduction station 128 and the air classifier 124 will each call for about 1,500 cfm, with the remaining 7,000 cfm being drawn from the magnetic drum separation units, transfer points and as needed from various locations throughout the circuit.

Exhaust Stack(s)

There may be one or more vent or exhaust stacks used in the exemplary system. A first stack 130 may be associated with and located downstream of the first baghouse. Air that flows through the filter media is vented or exhausted through the first stack 130. The potential emissions from the first stack 130 may involve products of combustion (from the air heaters 106, 108) as well as potential airborne particulate. Second and third stacks 132, 134 may provide an exhaust for and downstream of, respectively, the second and third baghouses 118, 122. Because, in the exemplary system, the second and third stacks 132, 134 do not communicate with the air heaters 106, 108, the emissions from these stacks will not include products of combustion. As shown in FIG. 7, each stack 130, 132, 134 may have an associated fan 136 to facilitate flow therethrough. Each fan 136 may communicate with an associated stack through an offset branch pipe 138 so that any moisture in the stacks can be maintained separate from the fans and drain through the base of the stacks.

Aspirators

An aspirator may be used in conjunction with a cyclone in the separation of particles based on size, shape, density, and surface characteristics. This may be accomplished by feeding the discharge from the secondary size reduction workstation 110 to a first aspirator 140. An air flow in the first aspirator 140 will cause the lighter, smaller particles to be lifted by the stream. In one implementation, such particles may then be drawn into an inlet of a cyclone, such as the second cyclone 116. The particles not lifted by the air stream may simply pass thru the first aspirator 140 as a result of gravitational forces, and may be routed to subsequent workstations, if desired. One exemplary aspirator is a model 6FF48 manufactured by Kice Industries of Wichita, Kans.

Of course, any number of aspirators may be used. In the implementation shown, three aspirators are used. A second aspirator 142 may receive material from a size reduction workstation, such as from a third size reduction workstation 128 in the system shown herein. The lighter, smaller particles are lifted from the air stream and in turn drawn into the inlet of the second cyclone 116, with the remaining particles simply passing thru the second aspirator 142. An exemplary second aspirator 142 may be a model 6FF36 manufactured by Kice Industries. A third aspirator 144 may have an inlet communicated with the coarse discharge from the second aspirator 142, a first outlet through which smaller, lighter materials are routed to the fourth cyclone 126 and a second outlet or coarse product discharge which may simply be collected rather than further processed. An exemplary third aspirator 144 may be a model 6F48 manufactured by Kice Industries. These exemplary aspirators are multiple stage aspirators, including, for example, six stages within each aspirator.

The operating parameters of each aspirator can be varied greatly to further improve or hone-in on the desired output of particles passing through unit (that is the separation limit where one particle is separated from another). With regard to the first aspirator 140 receiving the resulting product from the second size reduction workstation 110, the airflow may range from about 5,000 to 20,000 cfm depending on the nature of the feed stock, the desired separation parameters, and/or other factors. The second aspirator 142, which receives product from the third size reduction workstation 128, may have an airflow range between about 3,000 to 15,000 cfm depending on the percentage of larger metallic particles contained in the feedstock and/or other factors. The third aspirator 144, may be the smaller of the three aspirators and, may have an airflow rate in the range of about 1,000 to 10,000 cfm depending, for example, upon whether there was a significant amount of nonmetallic material liberated from the metallic fraction in the third stage of size reduction or if this later stage of reduction simply served to free up a small amount of residual nonmetallic material. Of course, these air flow rates are exemplary and are not intended to be all-inclusive or limiting.

Material Classifier

The coarse product from the both the second and third cyclones 116, 120 may be conveyed to the air classifier 124 to separate the material therein based on size. The air flow velocity in the air classifier 124 can be adjusted to facilitate the separation of the material into two size fractions. The larger materials will be routed to a coarse discharge of the aspirator 124 and the smaller materials will be routed to a fine discharge. In one implementation, materials greater than or equal in size to 150 mesh are routed to the coarse discharge and materials smaller than 150 mesh are routed to the fine discharge. Of course, any size value could be chosen for the threshold of separation. The air classifier 124 may be communicated with the dust collection system, to control or eliminate dust emissions therefrom. In the system shown, the air classifier 124 is communicated with the first cyclone 112 and first baghouse 114. An exemplary air classifier is Whirlwind manufactured by Sturtevant, Incorporated of Hanover, Mass., and in one exemplary system may be about 10 feet in diameter.

Separating the material based on size can improve the performance of downstream magnetic separators. For example, the performance of the magnetic separators may be improved by the upstream size classification by preventing smaller, essentially nonmetallic particles from being trapped by or between larger particles attracted by the magnetic field, and by providing each separator a lower flow rate of material to process (i.e. less material). Accordingly, larger particles may be routed to one magnetic separator and smaller particles to another magnetic separator to permit more accurate separation of the product delivered to each separator. The particle size or range of sizes at which the separation is made by the air classifier is variable and may change depending on the desired output product (e.g. percent of iron needed in the metallic product output), the feedstock being used, and other factors.

Size Reduction Workstations

As previously noted, the feedstock may be introduced into the circuit by way of the receiving hopper(s), and transported to the first size reduction workstation 104. The transfer of the feed stream to the first size reduction station 104 may take place on a conveyor in an enclosed transfer point that may include a dust collection port to route any potentially dust-laden air to the primary dust collection system including of the first cyclone 112 and the first baghouse 114.

The primary size reduction workstation 104 may include a rotary shaft impactor. The rotary shaft impactor may include four elements: 1) a housing lined with wear plates that may support multiple, independent, impact aprons; 2) a rotor configured with three breaker bars; 3) a hydraulically actuated rear housing that will provide access to the impactor for inspection, maintenance and adjustment of gap settings; and 4) one or more dust collection ports to exhaust the resulting air. The exhaust stream will also serve to transport the resulting fine, low density particles generated during the initial stage of size reduction of the slag feedstock. The slag material is propelled or projected by the rotor breaker bars into the wear plates at relatively high speed. Upon impact, the slag material tends to split or separate along boundaries between dissimilar materials. A shock wave may be created upon impact that facilitates the material separation and size reduction. In this way, the individual slag pieces in the feedstock may be reduced in size, as opposed to crushing or milling the slag pieces which tends to produce more dust and also may not as effectively break the pieces along the boundaries between dissimilar materials, leaving more slag pieces with dissimilar materials still bound together. One exemplary impactor is a Mega-Slam rotary crusher manufactured by Stedman Machine Company, located in Aurora, Ind. As previously noted, within the first size reduction workstation 104, the feed steam will not only undergo a reduction in particle size but will also encounter a hot air flow produced by the air heater 106. The resulting stream of moist air and the fine low density particles lifted from stream as it passes through the impactor will discharge by way of duct work that will be connected to the impactor 104. Using an impactor instead of a crusher or grinder may reduce the energy needed to effect the size reduction, and also the dust and smaller particulates generated during the size reduction. Of course, crushers and grinders can be used in place of, or in combination with the impactor.

The size reduced material discharged from the first size reduction workstation 104 may, if further size reduction is desired, be transferred to a secondary size reduction workstation 110. The secondary size reduction workstation 110 may include a vertical shaft impactor (VSI), such as that manufactured by Rock Engineered Machinery Company of Livermore, Calif. The operation of the VSI 110 is dependent upon the centripetal forces created as a result of the rotation of a rotor that projects the slag material outwardly into an annular impact ring. In such a VSI, the input material may be received at the top of the unit where there is a receiving chute to assist in containing the incoming material. The distribution of the slag results in a negative pressure being generated at the intake of the crusher, minimizing the release of dust. However, there may be a larger volume of dust-laden air emitted from the discharge of the VSI, and to contain that dust, the VSI may be enclosed and a relatively large amount of air may be used to draw out and route the resulting stream of air and fine particles to the first baghouse 114 and first cyclone 112. The slag material discharged from the VSI 110 may be routed to a first aspirator 140 in the system for a separation process.

If further size reduction is desired for further material separation and/or classification, the third size reduction workstation 128 may be used. One example of a device that may be used is a Gundlach Model 50B Cage-Paktor which consists of a series of nested cages that rotate in opposite directions. In use, the material is delivered into the center of an innermost cage and as the material works its way outwardly from the innermost cage it is impacted by striker plates that are traveling in the opposite direction to further reduce the size of the particles as they make their way towards a discharge chute of the device. The third size reduction workstation 128 may be connected to the dust collection system to control the dust and fine materials generated at that workstation. The resulting product not removed by the dust collection system may be conveyed to another workstation for further processing or separation. In one exemplary system, the product from the third size reduction workstation 128 is routed to the intake of the second aspirator 142.

Magnetic Separation

The coarse fraction of the product exiting the fourth cyclone 126 may be conveyed to a receiving hopper of a first magnetic separator 150, and the receiving hopper may span the length of a drum of the first magnetic separator to facilitate distribution of material along the drum. To assist in the delivery of the feed from the hopper a vibratory feeder may be used. The separation of the magnetic material from the non-magnetic material (or more magnetic from the less or non-magnetic material) results in two different material outlets from the magnetic separator 150. The less or non-magnetic fraction may be conveyed to a first silo 152 or other storage place or unit, or it may be routed to another workstation for further processing, as desired. The magnetic fraction may be conveyed to a second silo 154, or other storage place, or it may be routed to another workstation for further processing, as desired.

An exemplary first magnetic separator 150 may be a model DFA-50 Drum-in-Housing 36"diameter×60" width drum magnet manufactured by Eriez Magnetics. With the combined effects of gravity, the moving surface associated with the rotating drum, and the influence of the magnetic field within the drum, the particles are in turn directed to either the magnetic discharge, if they contain a sufficient amount of ferrous material, or to the non-magnetic discharge if they contain too little or no ferrous material. The magnetic separator 150 may be completely enclosed to prevent fine particles from escaping into the workplace. The enclosure may incorporate exhaust ports linked to the first cyclone 112 and first baghouse 114.

Of course, different magnetic separators may be used having the same or different magnetic field strengths, and/or other characteristics. In the system shown, the product exiting the coarse discharge of the air classifier 124 is routed to the receiving hopper of a second magnetic separator 156, which may also use a vibratory feeder. An exemplary second magnetic separator 156 may be a model DFA-50 Drum-in-Housing 36"diameter×120" width drum magnet which is also manufactured by Eriez Magnetics. The material exiting the air classifier 124 by way of its fine discharge may be conveyed to the receiving hopper of a third magnetic separator 158, which may also use a vibratory feeder. An exemplary third magnetic separator 158 may be a model DFA-50 Drum-in-Housing 36"diameter×96" width drum magnet which is also manufactured by Eriez Magnetics. From the second and third magnetic separators, the less or non-magnetic fraction of the material may be conveyed to the first silo 152 or other storage place or unit, or it may be routed to another workstation for further processing, as desired. And the magnetic fraction may be conveyed to the second silo 154, or other storage place, or it may be routed to another workstation for further processing, as desired.

In at least some systems, depending on the iron content in the resulting magnetic products coming off the first magnetic separator, it may be desirable to further reduce the size of that material at a supplemental station 180 to liberate the iron. After such supplemental size reduction, the material may be routed to a magnetic separator to again separate the less or non-magnetic material from the magnetic material. In one implementation, a Hosokawa Micronizer may be used for the supplemental size reduction, and its output may be routed to the second magnetic separator or another magnetic separator.

Magnetic field strengths used in the separation may vary depending upon, among other things, the materials being separated and the desired separation limit (e.g. the acceptable amount of nonmetallic product that may end up in the metallic product output). The magnetic drum separators may use or produce a magnetic field or magnetic flux density in the range of about 500 to 3,000 gauss. With use of high intensity rare earth magnets the range could be between about 2,000 to 12,000 gauss. Additionally, a positive air flow may be provided in the vicinity of the magnetic separators. The air flow, in at least one implementation, may be in the range of 100 to 2,000 fpm. Higher air flow rates may be used with stronger magnetic fields, if desired. For example, in the vicinity of any high intensity magnets the air flow rate may be up to about 6,000 fpm.

Material Handling

To facilitate the handling of smaller size particles or pieces of iron, a briquetting machine 160 may be incorporated into the system 100, as shown in FIG. 7. Lime and molasses can be used as a binder and mixed with the smaller iron pieces in a mixer 161. The mixture will serve as the feed stream to an extruder and the resulting matrix will in turn be injected into rotating dies as they simultaneously come together to apply sufficient pressure to consolidate the components within the cavities into briquettes displaying a more-or-less uniform dispersion of components.

As mentioned in the description of the system there may be three general stages in the processing of the as received slag: size reduction, classification, and magnetic separation. With air classification serving as one means of separating the metallic from the nonmetallic fraction of the particles as they pass through the different stages of the circuit there are continuous streams of air which serve to move the smaller, lower density particles. In the exemplary system 100, these particles are routed through cyclones to remove a courser fraction with the remaining fine particles being collected in baghouses and clean air routed to exhaust stacks associated with the baghouses.

In addition, there are a number of transfer points within the system where the material is conveyed from the discharge or outlet of one unit to the inlet of another. In the proposed system there may be four means used to convey the material at these transitions, namely: pneumatic, flexible screw, Flexowell and conventional belt conveyors. With transfer of the materials taking place within the confines of a pipe, in the case of the pneumatic or flexible screw conveyors, there is very little potential that dust would be emitted. With the Flexowell conveyor, although the material is exposed on one side, the corrugated walls and cleats serve to minimize the potential that the larger and denser particles being conveyed using this means would become airborne. Furthermore, where material is being discharged onto the Flexowell conveyor the conveyor may be covered and any resulting dust may be returned to the intake of one or more size reduction units such as by a negative pressure developed at the inlet, while also being assisted by the primary dust collection system. In the various stages of material handling the primary dust collection system, including of the first cyclone 112, and the first baghouse 114, serves as the initial means of lifting and in turn removing a significant portion the fine particles in the material stream.

Dense phase pneumatic transport systems may be used to convey material from various points throughout the facility, such as from one or more workstations to the silos. The pneumatic circuits may use pressurized air provided by one or more compressors or other source(s) 190 to move relatively dense slugs or material through pipes 192 from one location to another. The slugs more-or-less block off the pipes so that pressurized air delivered behind a slug will move the slug forward in the pipe. In the system shown, three pneumatic circuits are used to transport fine materials collected from the three baghouses. Two additional pneumatic circuits are used to route material from the magnetic separators to the silos. The resulting five circuits can be a very low maintenance system that would provide great flexibility, while completely containing and thus preventing any material from being released and becoming airborne or fugitive in nature. Of course, the noted circuits are exemplary only, other pneumatic devices or circuits could be used, as could any other desired mode of material transport. For example, flexible screw conveyors, like the pneumatic circuits, provide a means of transferring bulk material in a fashion that allows the stream to be completely contained and hence, can reduce or eliminate dust and other emissions.

In addition to these devices, other conveyors, like flighted conveyors can be used. In one exemplary system, flexowell flighted conveyor belts may be used to convey the slag in those areas of the circuit where a larger throughput is desired or realized. Flighted conveyor belts typically consist of three main components, the base belt, the sidewalls and cleats or flights. The belt itself generally serves as the base and may be rigid across its width but flexible longitudinally. The two sidewalls may be hot vulcanized onto the base belt and form the side panels of the conveyor, thus preventing material from slipping off the belt. The cleats (which may also be hot vulcanized onto the base belt) can have various shapes, widths, frequencies or spacing, and height to determine the design capacity of the conveyor and in turn ability to transfer material without the generation of fugitive dust.

Conventional rubber conveyor belts may be used to convey bulk material from the receiving hopper(s) to one or more feedstock piles or directly to the first size reduction workstation. A conveyor of conventional design will also be used in the handling of the waste stream discharge from one or more mixers. The mixers may be used to add moisture that will result in a moist, dust free cake, being discharged onto the conveyer and in turn loaded into the trucks that transport the waste to the local landfill.

Dust sensors or monitors 170, may be used downstream of each baghouse 114, 118, 122 to provide an alarm in case dust particles beyond a threshold pass through the baghouse. One exemplary dust monitor 170 is a model FT4100 manufactured by Babbitt International which includes a probe that is placed in the discharge duct of the baghouses. Dust particles passing by the probe induce an electrical charge along that is communicated with a control unit 172. The control unit 172 may display the sensed values and also provide an output signal proportional to the level of emissions detected by the probe. In turn the output signal can be communicated with a control center where based on the level indicated, additional action can be taken if warranted. More than one dust threshold may be monitored or set and various alarm levels and outputs can be set, as desired. In addition to the dust monitor 170, other sensors may be used to monitor the operation of the baghouses. For example, a pressure sensor may be used to monitor the difference in pressure between the upstream or dirty side of the baghouse and the downstream or clean side of the baghouse. The differential pressure that develops across the filter media is an indication of how much dust has accumulated on the bags and in turn whether the bags need to be cleaned or replaced.

Exemplary System Overview

Having set forth a description of the various phases and workstations used in the exemplary slag processing system 100, a brief overview of the whole system will now be described. Incoming material to be processed is fed to the receiving hopper of the first size reduction workstation 104. Heated air may be provided into the impactor of the first size reduction workstation 104, and that air, along with any negative pressure signal from the first cyclone 112 may move the air and light/small particulates to the first cyclone 112. The first cyclone 112 passes larger particles to a coarse discharge which may be pneumatically conveyed to a product storage area such as the silos 152. The smaller material from the first cyclone 112 and the air flow is routed to the first baghouse 114. Larger pieces of the slag material are discharged from the first size reduction workstation 104 and routed to the second size reduction workstation 110.

From the second size reduction workstation 110, the smaller, lighter particles may be carried away in an air flow to the first cyclone 112 and first baghouse 114. The larger pieces of slag material are discharged from the second size reduction workstation 110 and routed to the first aspirator 140. From there, the smaller and lighter particles are routed to the second cyclone 116 and the larger pieces are routed to the third size reduction workstation 128. From the second cyclone 116, the smaller/lighter particles and air flow are routed to the second baghouse 118 and the larger pieces are routed from the coarse discharge of the second cyclone 116 to the first air classifier 124. The smaller/lighter particles may be routed from the third size reduction workstation 128 to the first cyclone 112 and first baghouse 114. And the larger pieces from the third size reduction workstation 128 may be routed to the second aspirator 142.

From the second aspirator 142, the smaller/lighter particles are routed to the third cyclone 120 and the larger pieces are routed to the third aspirator 144. From the third cyclone 120, the smaller/lighter particles and air flow are routed to the third baghouse 122, and the larger pieces from the coarse discharge are routed to the air classifier 124.

From the third aspirator 144, the smaller/lighter particles are routed to the fourth cyclone 126 and the larger pieces are routed to a product storage area for metallic products or a concrete pad outside the processing facility, or other area. From the fourth cyclone 126, the smaller/lighter particles and air flow are routed to the third baghouse 122, and the larger pieces from the coarse discharge are routed to the first magnetic separator 150.

The more magnetic materials discharged from the first magnetic separator 150 may be routed to a storage area, such as a silo 154 for metallic products. The less or non-magnetic products from the first magnetic separator 150 may be routed to a different storage area, such as a silo 152 for nonmetallic products.

From the air classifier 124, the larger pieces of slag material may be routed to the second magnetic separator 156, and the smaller/lighter particles may be routed to the third magnetic separator 158. Both the second and third magnetic separators 156, 158 may lead to product storage areas, such as silos 152, 154 for the respective metallic (or more magnetic) product and nonmetallic (or less or non-magnetic) products.

The system 100 can be arranged to reduce power consumption and hence, increase the efficiency of separating out the various products or factions from the steel slag. This can be done, for example, by choosing less energy intensive processes or equipment to break apart and separate the slag products or factions. As already noted, an impactor 104 may be used to initially reduce the size of slag particles in the system. The impactor may use much less energy that grinding or crushing the slag and may provide a high throughput of material. Grinding, crushing or other higher energy intensive processes still can be used in the system. In one implementation, such higher energy intensive processes are used after some of the product or factions have been separated so that the higher energy intensive process is not used on all of the material. By using such a process on less material, less energy may be used. The air classifier can also be a low energy workstation compared to other devices used to separate product streams as set forth herein. Further, by dividing the product into various streams and using multiple, similar workstations (for example, multiple cyclones, multiple magnetic separators, multiple aspirators and multiple size reduction workstations), smaller devices can be used at each workstation with each device handling less material. This may permit use of devices that require less power to operate, and may permit more control over the power consumption of any one device depending on the volume/rate of material fed to that device at any given time. That is, the system can be flexible to reduce power consumption of devices when the demand on such devices is less. In one example, a system that processes about one hundred fifty tons/hour of slag may utilize equipment requiring only 3,200 horsepower to operate, which includes handling the incoming feedstock, processing the feedstock, briquetting the resulting product as well as the storage and load-out of the various end products.

In one exemplary implementation, 150 tons/hour of slag is input into the system and processed to produce a desired iron content in the metallic product output, and/or a desired content of other products, including nonmetallic products. The nonmetallic (or less metallic) product may also be processed to provide an output having desired characteristics. With one hundred fifty tons/hour fed to the primary size reduction workstation 104, perhaps one hundred twenty-five tons/hour is routed to the second size reduction workstation 110, and perhaps one hundred tons/hour to the third size reduction workstation 128. Approximately sixty tons/hour may be discharged from the second aspirator 142 and delivered to the third aspirator 144, with forty tons/hour delivered to the third cyclone 120. Twenty-five tons/hour may be discharged from the second cyclone 116 to the air classifier 124. From the third aspirator 144, about thirty-six tons/hour may be output as coarse metallic product. From the fourth cyclone 126, about twenty-four tons/hour may be fed to the first magnetic separator 150, and about five tons/hour of metallic product and nineteen tons/hour of nonmetallic product (or product with lower iron content) may result. From the air classifier 124, thirteen tons per hour may be fed to the third magnetic separator 158 with about two tons/hour of metallic product and 11 tons/hour of nonmetallic product resulting. Also from the air classifier 124, fifty-two tons/hour may be fed to the second magnetic separator 156 with about 11 tons/hour of metallic product and 41 tons/hour of nonmetallic product resulting. Of course, the above rate of materials input to or resulting from any portion of the system are exemplary only and depend upon the material content of the feed stock, the desired iron content in the metallic product, and any other requirements for the resulting products.

Of course, the above description is set forth in view of presently preferred embodiments and is not intended to limit the invention in any way. There can be many other variations and combinations of the separation techniques and processes disclosed herein. Any of the process steps, workstations or machines can be used in combinations other than as specifically described, to achieve a desired separation of products from the slag material. Further, more or fewer workstations, phases, steps or machines may be used. While certain materials have been referred to as "metallic product", it is understood that such products may contain some percentage, even a significant percentage, of nonmetallic components or particles and the metallic faction may include metallic iron and iron oxide. Likewise, while certain materials have been referred to as "nonmetallic product", it is understood that such products may contain some or even a significant percentage of metallic components or particles, including iron. All such variations and combinations are intended to fall within the spirit and scope of this invention, as set forth in the following claims.

The invention claimed is:

1. A process, comprising:
    reducing the average particle size of slag from a steelmaking process into finer particle size material by directing the slag against a surface at a velocity sufficient to cause the slag to break into smaller pieces; and
    separating the finer particle size material into at least an iron rich product and a silicate rich product based on the differences between these products in at least one or more properties including magnetic susceptibility, particle size, weight or specific gravity, wherein reducing the average particle size of slag is accomplished by a plurality of rotating blades that project the slag against a plate so that the impact of the slag against the plate breaks the slag into smaller pieces.

2. The process of claim 1 wherein material is separated by applying a magnetic field in at least two phases wherein in a first phase a magnetic field of a first strength is applied to the material to separate out a metallic iron rich product and in a second phase a magnetic field at a strength that is greater than the first strength is applied to the material remaining after the first phase to separate the remaining material into an iron oxide rich product and a silicate rich product.

3. The process of claim 2 wherein a forced air flow is applied to the material at the same time the magnetic field is applied to the material.

4. The process of claim 1 which also includes removing the finest particle size material to a dust collection system and permitting the larger particle size material to proceed for further processing.

5. The process of claim 4 wherein the finest particle size material is removed by a subatmospheric pressure source.

6. The process of claim 5 wherein the subatmospheric pressure source is a cyclone and the lightest and smallest material removed by the cyclone is sent to a filter and the larger and heavier materials are further processed.

7. The process of claim 4 wherein the finest particle size material is removed by a forced air flow.

8. The process of claim 7 wherein the forced air flow is generated by an air heater that provides an air flow to a size reduction workstation wherein the average particle size of the slag is reduced.

* * * * *